(12) United States Patent
Cantave et al.

(10) Patent No.: US 6,443,999 B1
(45) Date of Patent: Sep. 3, 2002

(54) LITHIUM CELL WITH HEAT FORMED SEPARATOR

(75) Inventors: Reynald A. Cantave, Bridgewater; Fred J. Berkowitz, Hudson; William T. McHugh, Westwood; Jane A. Blasi, Acton; Ernesto Figueira, Brighton, all of MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/527,508

(22) Filed: Mar. 16, 2000

(51) Int. Cl.[7] .................................................. H01M 2/18
(52) U.S. Cl. ....................... 29/623.1; 429/133; 429/247
(58) Field of Search ............................... 429/52–56, 94, 429/247, 129, 131, 140, 133; 29/623.1

(56) References Cited

U.S. PATENT DOCUMENTS

| | | | |
|---|---|---|---|
| 4,279,972 A | | 7/1981 | Moses |
| 4,565,002 A | * | 1/1986 | Matsuo ....................... 29/623.4 |
| 4,565,753 A | * | 1/1986 | Goebel .......................... 429/94 |
| 4,707,421 A | | 11/1987 | McVeigh |
| 4,929,518 A | * | 5/1990 | Yoshinaka .................... 429/54 |
| 4,937,154 A | | 6/1990 | Moses |
| 5,458,993 A | * | 10/1995 | Terao .......................... 429/94 |
| 5,595,835 A | * | 1/1997 | Miyamoto .................... 429/56 |
| 5,714,278 A | * | 2/1998 | Mallinson ................... 429/126 |
| 5,776,629 A | | 7/1998 | Degan |

FOREIGN PATENT DOCUMENTS

| | | | | |
|---|---|---|---|---|
| JP | 01-122574 A | | 5/1989 | |
| JP | 01-307176 A | | 12/1989 | |
| JP | 63-136383 | * | 12/1989 | .......... H01M/10/40 |
| JP | 03-025865 A | | 2/1991 | |
| JP | 11096982 | * | 4/1999 | ............ H01M/2/08 |

* cited by examiner

*Primary Examiner*—Patrick Ryan
*Assistant Examiner*—Mark Ruthkosky
(74) *Attorney, Agent, or Firm*—Barry D. Josephs; Paul I. Douglas; Thomas G. Krivulka

(57) ABSTRACT

A primary lithium cell having a wound electrode assembly. The electrode assembly comprises an anode comprising lithium, a cathode comprising a manganese dioxide and an electrolyte permeable separator therebetween. The electrode assembly comprises a cathode sheet, an anode sheet and electrolyte permeable separator sheet therebetween. The sheets are wound into a spiral roll. An exposed edge of each revolution of the separator sheet is then heat treated, for example, by applying a heated platen thereto to mold said exposed edge into a continuous separator membrane. The continuous separator membrane, so formed, covers and seals off said edge of adjacent revolutions of the cathode sheet and thus provides electrical insulation therefor. The electrode assembly can then be inserted into the cell casing so that the continuous separator membrane abuts a surface of the casing and provides electrical insulation between the casing and the wound cathode sheet. This reduces the total amount of electrical insulation needed between the cell casing and wound electrodes and thereby frees up void volume which can be used for additional active material, for example, by making the anode and cathode sheets wider.

4 Claims, 7 Drawing Sheets

LITHIUM CELL WITH HEAT FORMED SEPARATOR

FIELD OF THE INVENTION

The invention relates to spirally wound lithium cells having an anode comprising lithium and a cathode comprising a manganese dioxide with a separator therebetween.

BACKGROUND

Primary (non-rechargeable) electrochemical cells having an anode comprising lithium are known and are in widespread commercial use. The anode is comprised essentially of lithium metal. Such cells typically have a cathode comprising manganese dioxide, and electrolyte comprising a lithium salt such as lithium trifluoromethane sulfonate ($LiCF_3SO_3$) dissolved in a nonaqueous solvent. The cells are referenced in the art as primary lithium cells (primary Li/$MnO_2$ cells) and are generally not intended to be rechargeable. Alternative primary lithium cells with lithium metal anodes but having different cathodes are also known. Such cells, for example, have cathodes comprising iron disulfide ($FeS_2$). These cells are commonly in the form of button cells or cylindrical cells having about ⅔ the height of a conventional AA size alkaline cell. (Alkaline cells as referenced herein shall be understood to be conventional commercial alkaline cells having an anode comprising zinc, a cathode comprising manganese dioxide, and an electrolyte comprising potassium hydroxide.) The Li/$MnO_2$ cells have a voltage of about 3.0 volts which is twice that of conventional Zn/$MnO_2$ alkaline cells and also have higher energy density (watt-hrs per $cm^3$ of cell volume) than that of alkaline cells. Primary lithium cells are in widespread use as a power source for many conventional photographic flash cameras, which require operation at higher voltage and at higher power than is supplied by individual alkaline cells.

Primary lithium cells (other than button cells) are conventionally formed of an electrode composite comprising an anode formed of a sheet of lithium, a cathode formed of a coating of cathode active material comprising manganese dioxide on a conductive metal substrate (cathode substrate) and a sheet of electrolyte permeable separator material therebetween. The separator sheet is typically placed on opposite sides of the lithium anode sheet and the cathode sheet is placed against one of the separator sheets, thereby separating the anode and the cathode sheets. The electrode composite is spirally wound and inserted into the cell casing, for examples, as shown in U.S. Pat. No. 4,707,421. The cathode substrate is typically a stainless steel expanded metal foil. A portion of the anode sheet is typically electrically connected to the cell casing which forms the cell's negative terminal. The cell is closed with an end cap which is insulated from the casing. The cathode sheet can be electrically connected to the end cap which forms the cell's positive terminal. The casing is typically crimped over the peripheral edge of the end cap to seal the casing's open end. The primary lithium cell is typically provided with PTC (positive thermal coefficient) device located under the end cap and connected in series between the cathode and end cap. Such device protects the cell from discharge at a current drain higher than a predetermined level. Thus, if the cell is drained at an abnormally high current, e.g., higher than about 2 Amp, the PTC device expands and heats causing its resistance to increase dramatically, thus shutting down the abnormally high drain.

The primary lithium cell is a nonaqueous cell. The manganese dioxide powder used to form the cathode active material can be conventionally heat treated at temperatures of between about 200–350 ° C. in vacuum as taught in U.S. Pat. No. 4,133,856 (Ikeda). It is preferable to heat the $MnO_2$, for example, electrolytic $MnO_2$ (EMD) in two steps once to temperatures above 250 ° C. to drive off non-crystalline water during which step gamma $MnO_2$ is gradually converted to gamma-beta structure. The heated $MnO_2$ can then be heated at higher temperatures between 250 and 350 ° C. as described in U.S. Pat. No. 4,133,856 prior to insertion of the $MnO_2$ into the cell. The treatment results in better cell performance and higher capacity. The second heating helps to prevent electrolyte leakage. The treated $MnO_2$ is mixed with suitable binders, for example, tetrafluoroethylene (Teflon) binders, and conductive agents, for example, carbon black and graphite. The cathode mixture can be coated onto a metallic substrate such as a stainless steel expanded metal foil.

The anode can be formed by coating a layer of lithium on a metallic substrate such as copper. However, it is preferable that the anode is formed of a sheet of lithium without any substrate.

The electrolyte used in a primary lithium cell is formed of a lithium salt dissolved in an organic solvent. Typically, the salt is lithium perchlorate ($LiClO_4$) or lithium trifluoromethanesulfonate ($LiCF_3SO_3$). Other salts which are conventionally used include $LiPF_6$, $LiAsF_6$ and $LiCF_3CO_2$ and $LiBF_4$. Organic solvents can typically include ethylene carbonate/propylene carbonate (EC/PC) dimethoxyethane (DME), dioxolane, gamma-butyrolactone, and diglyme.

Recently electronic devices, such as digital cameras, fully featured photographic flash cameras, as well as some high power toys and electronic games have appeared in the commercial market. These devices, require sustained load voltages of at the level of between about 2.5 and 3 Volt and demand high power which can be satisfied with the use of primary lithium cells. Although present commercial primary lithium cells can be used to power many of these devices, it is desirable to increase the cell's capacity where possible in order to make the lithium cell even more attractive for such application.

It is desirable to increase the lithium cell's capacity (mAmp-hr) for a given cell size, where technically and economically feasible provided that there is no significant sacrifice in the cell's power output.

SUMMARY OF THE INVENTION

The invention is directed to improvements in spirally wound primary lithium cells to increase the electrochemical capacity (mAmp-hr) of a cell of any given size and shape without changing the basic cell chemistry or thickness of the individual sheets comprising the spirally wound electrode assembly therein. The spirally wound electrode assembly within the cell casing is formed by spirally winding an electrode composite comprising an anode sheet of lithium, a cathode sheet comprising a manganese dioxide and a separator of electrolyte permeable material therebetween. The manganese dioxide can include any form of manganese dioxide useful as cathode active material in primary lithium cells, for example, manganese dioxide, heat treated electrolytic manganese dioxide (EMD) and lithiated manganese dioxide. The cell casing, typically a cylindrical metal casing, has an open end and a closed end. After the electrode composite is spirally wound it is inserted into the open end of the metal casing until it comes to rest against the casing closed end. Electrolyte can then be added.

A principal aspect of the invention is directed to forming improved electrical insulation around the spiral electrode assembly of a primary lithium cell. The improved insulation is accomplished by reshaping an edge of the separator layer, as by heat forming, and using said reshaped portion of the separator layer to also function as a continuous electrical insulation layer between the positive cathode sheet and the cell casing, particularly at the closed end of the casing.

An aspect of the invention involves first forming a spirally wound electrode assembly with the bottom edge of the wound separator sheet extending beyond the bottom edge of the wound anode and cathode sheets thereby exposing the bottom edge of the wound separator sheet. At this stage of formation, the bottom edge of the separator sheet is aligned parallel to the bottom edge of the cathode sheet and therefore there are gaps between each revolution of the bottom edge of the separator sheet and the bottom edge of the cathode sheet. (The term "bottom edge", as used herein, is defined as that edge of the spiral electrode assembly which abuts the casing closed end when the spiral electrode assembly is inserted into the casing.)

In accordance with a principal aspect of the invention a heat source, preferably a heated platen, can be applied to the exposed bottom edge of the separator sheet extending from the bottom of the spirally wound electrode assembly. The separator sheet is electrolyte permeable and heat deformable, preferably of thermoplastic material. A desirable electrolyte permeable sheet having such properties is microporous polypropylene. Alternatively, the separator can be of microporous polyethylene or laminates of polyethylene and polypropylene. The exposed bottom edge of separator softens or melts upon contact with the heat source thereby reshaping the edge by thermoforming. When the heat source is removed, the bottom edge of the separator sheet, upon cooling, solidifies into a continuous (thermoformed) separator membrane which covers the exposed bottom edge of the cathode sheet. Thus, when the electrode assembly is inserted into the cell casing the continuous (thermoformed) separator membrane forms a continuous electrical insulation layer between the bottom edge of the cathode sheet and the inside surface of the closed end of the casing.

Since the continuous separator membrane also lies flush against the bottom edge of the cathode sheet, void space normally present between the bottom of the spirally wound electrode assembly and the closed end of the casing is eliminated. (The term "void space" as used herein is intended to mean space not occupied with electrochemically active anode or cathode material.) Also the formation of such a continuous separator membrane covering and electrically insulating the bottom edge of the cathode sheet makes it possible to eliminate the electrical insulating disk which is normally inserted between the bottom edge of the electrode assembly and the inside surface of the closed end of the casing. The space saved by eliminating such void volume can now be utilized by increasing the amount of anode and cathode active material in the cell, for example, by making the electrode sheets wider thereby increasing cell capacity.

BRIEF DESCRIPTION OF THE DRAWINGS

The invention will be better understood with reference to the drawings in which.

DETAILED DESCRIPTION

Figure 2A:
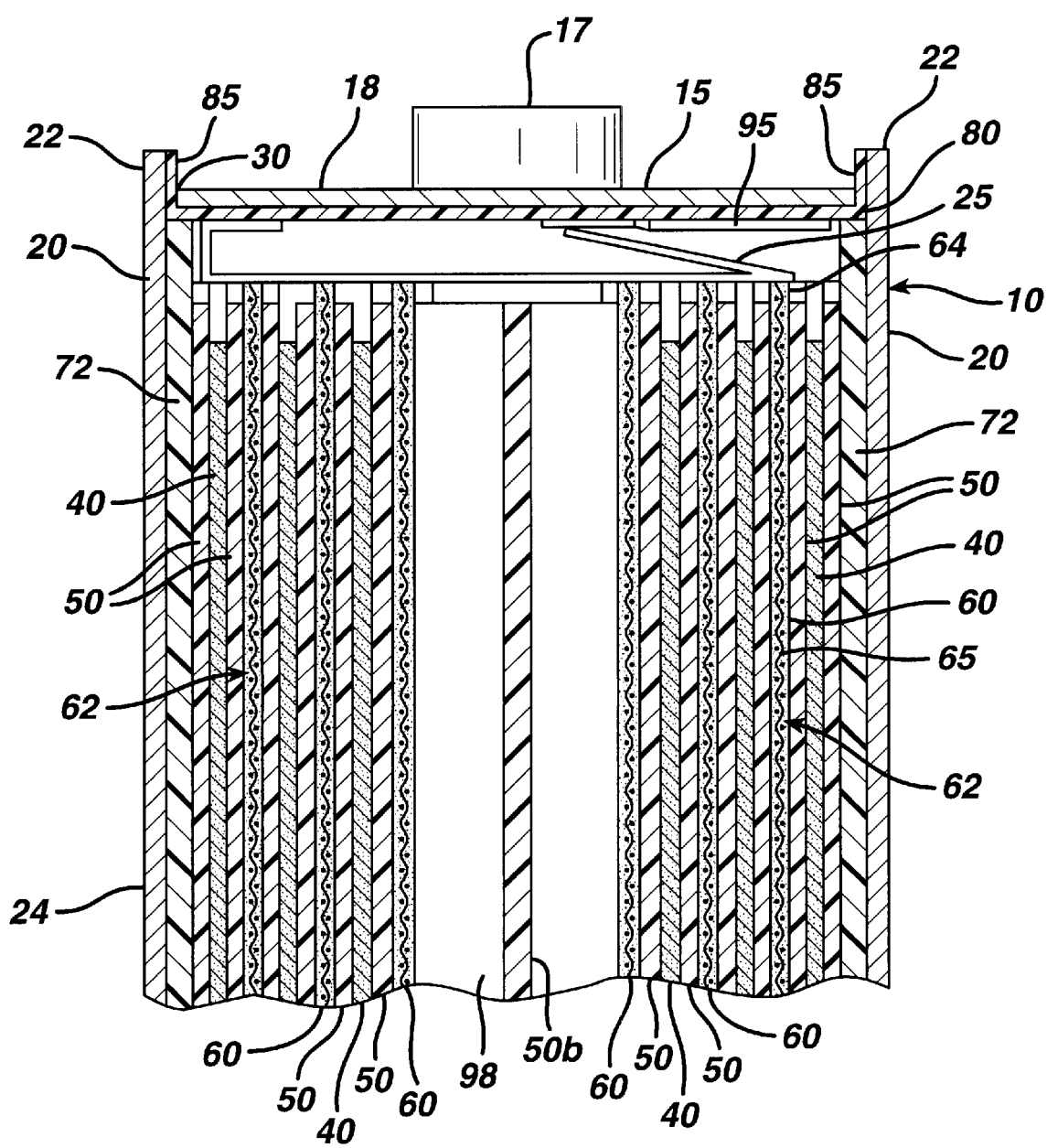
FIG. 2A is a partial cross sectional elevation view of the cell taken through sight lines 2—2 of FIG. 1 to show the top and interior portion of the cell.
Figure 2B:
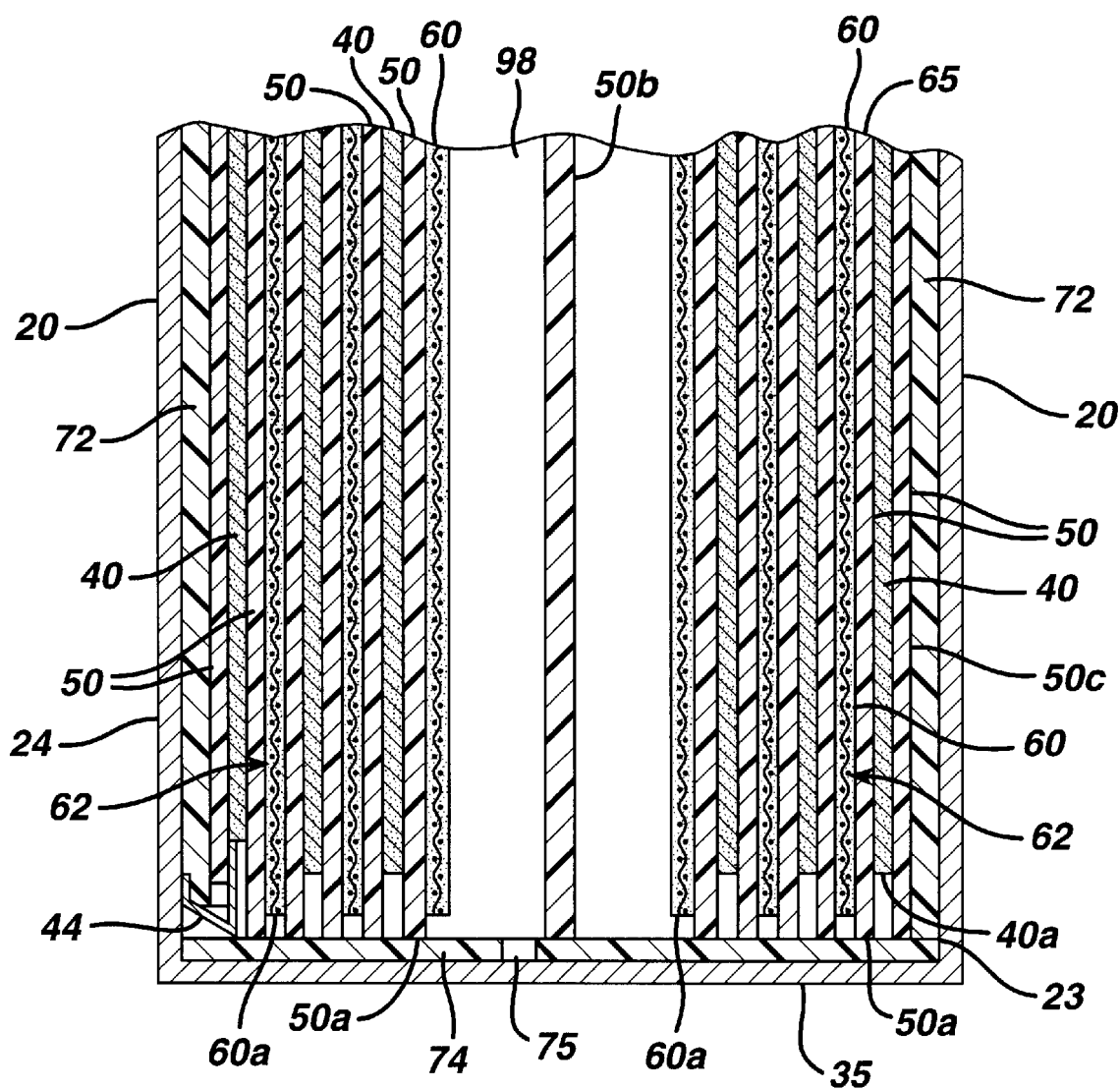
FIG. 2B is a partial cross sectional elevation view of the cell taken through sight lines 2—2 of FIG. 1 to show a spirally wound electrode assembly wherein the bottom edge of the separator has not been heat treated.
Figure 2C:
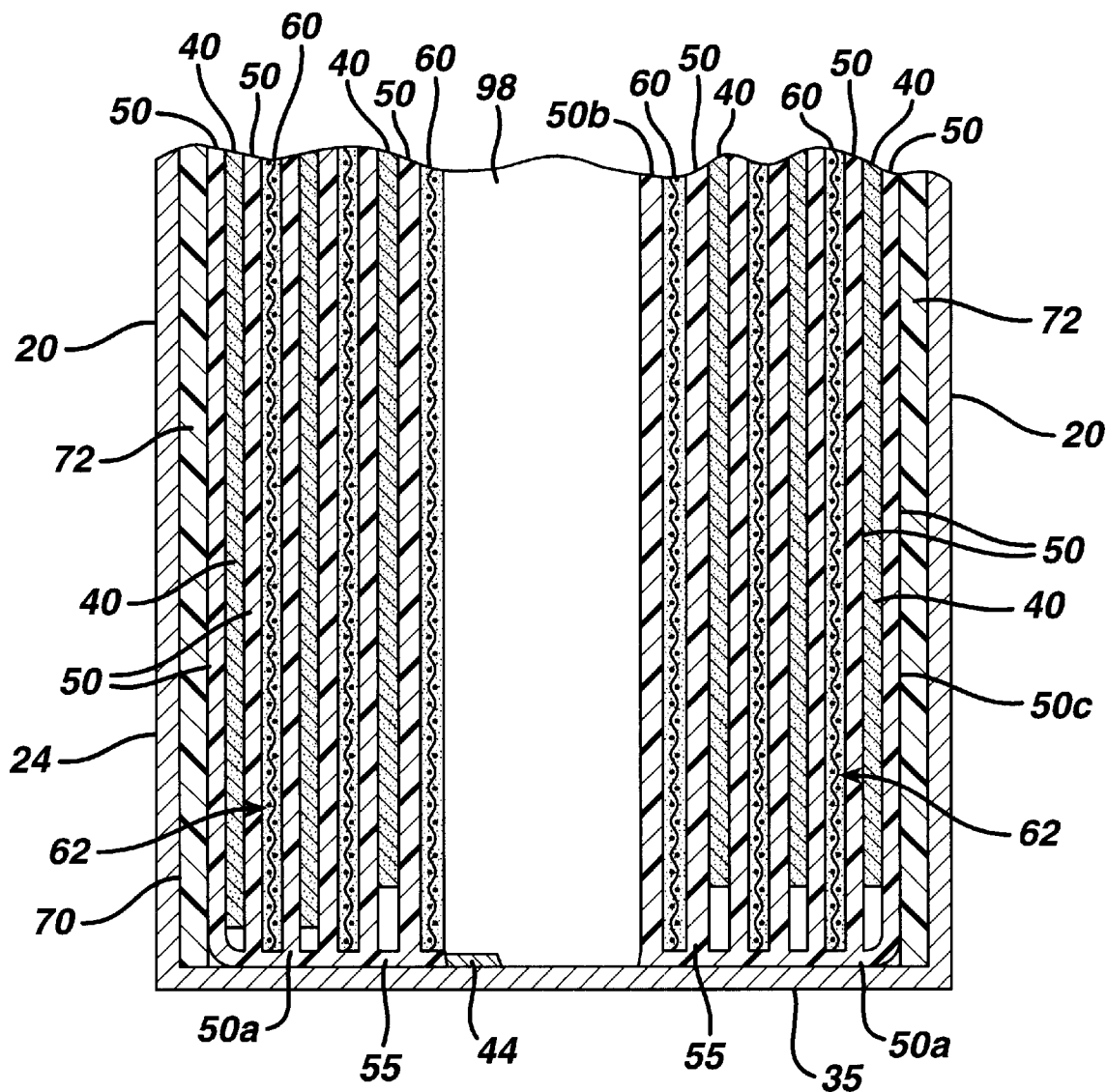
FIG. 2C is a partial cross sectional elevation view of the cell taken through sight lines 2—2 of FIG. 1 to show a spirally wound electrode assembly wherein the bottom edge of the separator has been reshaped (thermoformed) by the heat treatment process of the invention.

Specific embodiments of a primary (non rechargeable) cell having an anode comprising lithium and a cathode comprising a manganese dioxide are shown in the Figures. A preferred embodiment of the invention is shown in FIG. 2C. The term "manganese dioxide" as used herein is intended to include all forms of manganese dioxide, for example, electrolytic manganese dioxide (EMD), heat treated manganese dioxide, and lithiated manganese dioxide used as cathode active material in primary lithium cell. The electrodes are in spiral configuration. The cell is preferably cylindrical. Although the invention is described with respect to a cylindrical cell, this is intended as a nonlimiting example, since other cell shapes, for example, prismatic cells, are possible. The invention is also not intended to be limited to cell size. For example, the invention is specifically applicable to conventional ⅔ A size cells (⅔ the height of an A cell) typically employed with spirally wound primary lithium cells. The invention, however, is also applicable to conventional AAAA, AAA, AA, C and D size cells.

Figure 1:
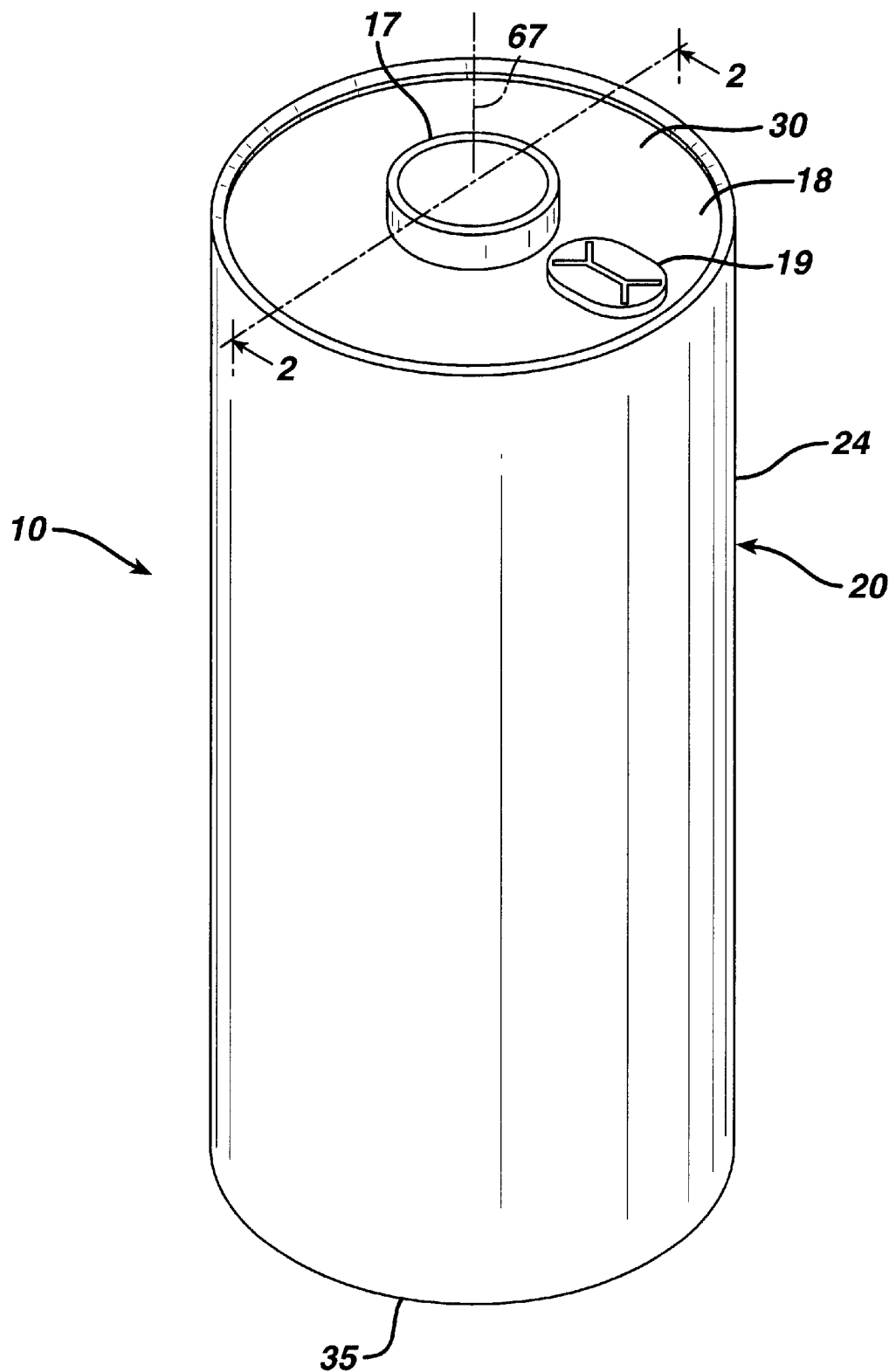
FIG. 1 is an isometric view of an embodiment of the cell of the invention.
Figure 3:
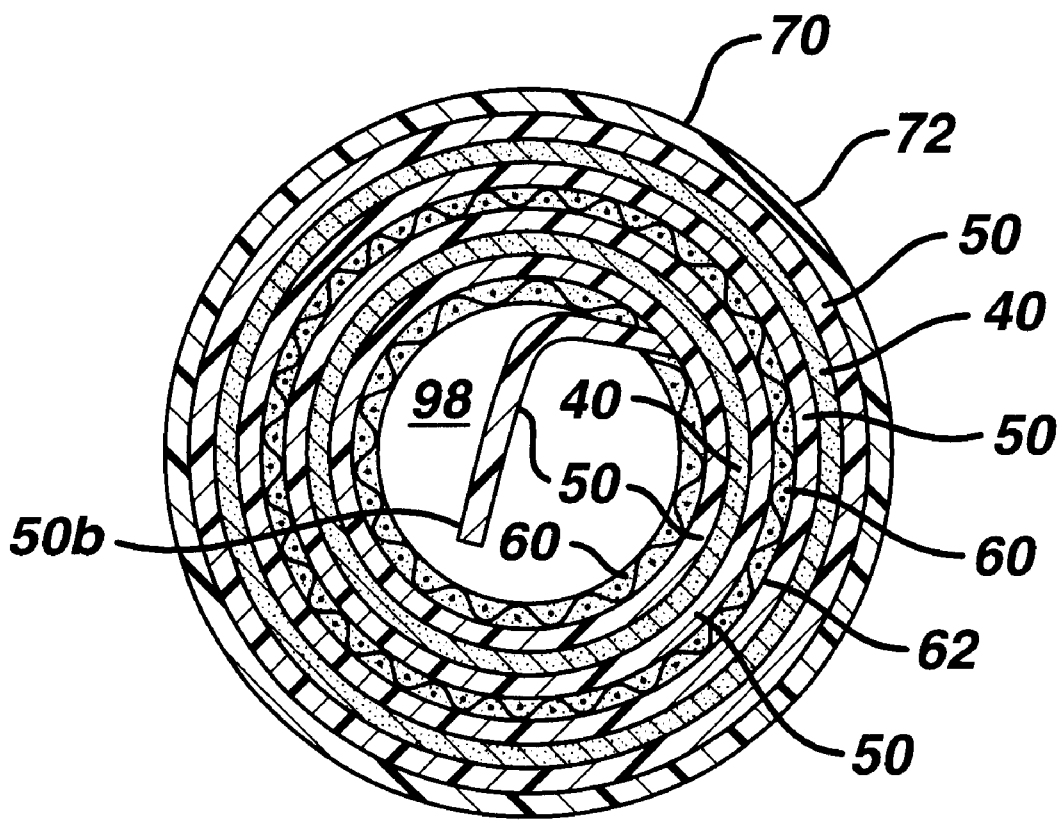
FIG. 3 is a cross sectional view (taken perpendicular to the cell's longitudinal axis) of the spiral electrode assembly.
Figure 4:
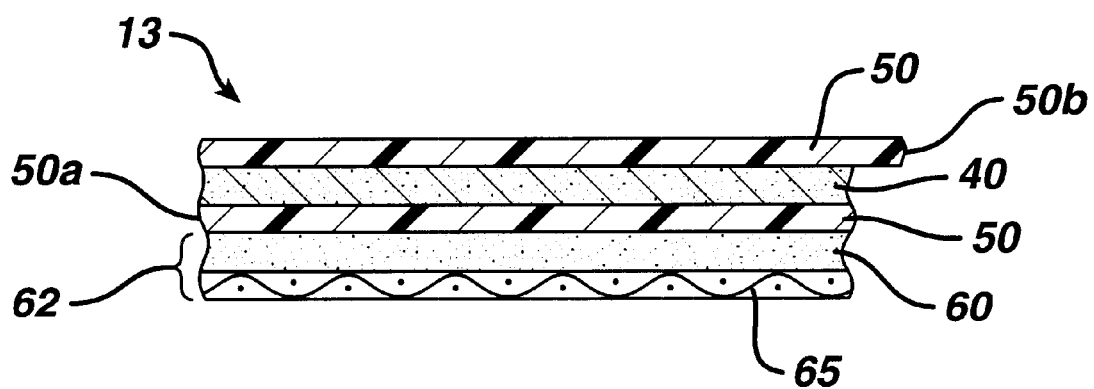
FIG. 4 is a schematic showing the placement of the layers comprising the electrode assembly.

The preferred shape of the cell casing (housing) 20 is cylindrical as shown in FIG. 1. Casing 20 is preferably formed of nickel plated steel. The cell casing 20 (FIG. 1) has a continuous cylindrical surface 20. The spiral wound electrode assembly 70 (FIG. 3) comprising anode 40 and cathode composite 62 with separator 50 therebetween can be prepared by spirally winding a flat electrode composite 13. The electrode composite 13 (FIGS. 4 and 5) can be made in the following manner: A cathode mixture 60 comprising manganese dioxide can be prepared and coated onto a substrate sheet 65 of stainless steel expanded metal foil to form a cathode composite sheet 62 (FIG. 4). The cathode coating 60 can be prepared have the following desirable formulation: manganese dioxide (electrolytic manganese dioxide, EMD), 90.9 wt.%, tetrafluoroethylene (Teflon polymer), 3.0 wt.%, Shawinigan carbon black, 4.1 wt. %, and particulate graphite, 2.0 wt.%. The manganese dioxide was heat treated in conventional manner to remove noncrystalline water therefrom before the cathode coating 60 was prepared. The cathode mixture can be mixed in a conventional electric blender at room temperature until a homogeneous mixture is obtained. The cathode mixture 60 can be coated on one side of a cathode substrate 65 to form cathode composite sheet 62. The cathode substrate 65 is preferably a stainless steel expanded metal foil (EXMET stainless steel foil from Exmet Company) having a basis weight of about 0.024 g/cm². It appears as a porous mesh or screen. Alternatively, the cathode substrate 65 can be a stainless steel foil. The cathode coating 60 on the substrate 65 desirably has a thickness of between about 0.38 and 0.42 mm, preferably about 0.4 mm. The stainless steel substrate 65 secures the cathode coating 60 and functions as a cathode current collector during cell discharge. The composite sheet 62 can desirably have a thickness of about 0.4 mm.

The anode 40 can be prepared from a solid sheet of lithium metal. The anode 40 is desirably formed of a continuous sheet of lithium metal (99.8 % pure). Alternatively, the anode 40 can be an alloy of lithium and an alloy metal, for example, an alloy of lithium and aluminum. In such case the alloy metal, is present in very small quantity, preferably less than 1 percent by weight of the lithium alloy. Upon cell discharge the lithium in the alloy thus functions electrochemically as pure lithium. Thus, the term "lithium or lithium metal" as used herein and in the claims is intended to include such lithium alloy. The lithium sheet forming anode 40 does not require a substrate. The lithium anode 40 can be advantageously formed from an extruded sheet of lithium metal having a thickness of desirably between about 0.15 and 0.20 mm desirably between about 0.16 and 0.17 mm, preferably about 0.165 mm.

Figure 5:
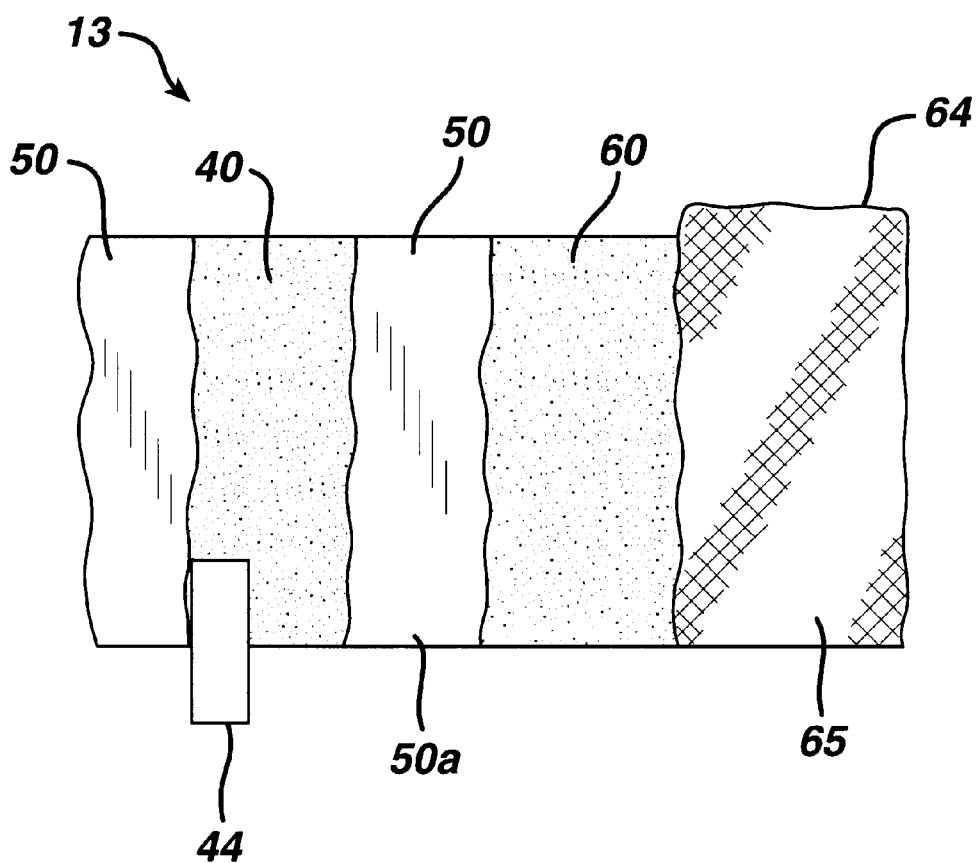
FIG. 5 is a plan view of the electrode assembly of FIG. 4 with each of the layers thereof partially peeled away to show the underlying layer.

Individual sheets of electrolyte permeable separator material 50, preferably of microporous polypropylene having a thickness of about 0.025 mm is inserted on each side of the lithium anode sheet 40 (FIGS. 4 and 5). The first (top) separator sheet 50 (FIG. 4) can be designated the outer separator sheet and the second sheet (FIG. 4) can be designated the inner separator sheet. The cathode composite sheet 62 comprising cathode coating 60 on conductive substrate 65 is then placed against the inner separator sheet 50 to form the flat electrode composite 13 shown in FIG. 4. The flat composite 13 (FIG. 4) is spirally wound to form electrode spiral assembly 70 (FIG. 3). The winding can be accomplished using a mandrel to grip an extended separator edge 50*b* of electrode composite 13 and then spirally winding composite 13 to form wound electrode assembly 70. When the winding is completed separator portion 50*b* appears within the core 98 of the wound electrode assembly 70 (FIGS. 2A and 2B). As may be seen from FIG. 3 the electrode spiral 70 has separator material 50 between anode sheet 40 and cathode composite 62. The spirally wound electrode assembly 70 has a configuration (FIG. 3) conforming to the shape of the casing body. The spirally wound electrode assembly 70 is inserted into the open end 30 of casing 20. As wound, the outer layer of the electrode spiral 70 comprises separator material 50 shown in the figures. An additional insulating layer 72, for example, a plastic film such as polyester tape, can desirably be placed over the outer separator layer 50, before the electrode composite 13 is wound. In such case the spirally wound electrode 70 will have insulating layer 72 in contact with the inside surface of casing 20 (FIG. 2A and 2B) when the wound electrode composite is inserted into the casing. Alternatively, the inside surface of the casing 20 can be coated with electrically insulating material 72 before the wound electrode spiral 70 is inserted into the casing. Also an electrical insulating material 74 (FIG. 2B), for example in the form of an insulating disk 74 can be inserted into casing 20 to line the bottom (closed end 35) of the casing before the spirally wound electrode composite 70 is inserted into the casing. Insulating material 74 can be employed to prevent cathode material from inadvertently contacting the casing bottom 35 and thus provides additional assurance that the cell will not short.

Electrolyte can be added to the wound electrode spiral 70 after it is inserted into the cell casing 20. The electrolyte desirably has the following composition: Lithium salts of lithium trifluoromethanesulfonate (LiCF$_3$SO$_3$), 9.3 wt.%, LiNO$_3$, 500 ppm, solvents ethylene carbonate/propylene carbonate (EC/PC) 34.5 wt.%, dimethoxyethane (DME), 56.2 wt.%.

An end cap 18 forming the cell's positive terminal has a metal tab 25 (cathode tab) which can be welded on one of its sides to inside surface of end cap 18. Metal tab 25 is preferably of stainless steel. A portion of the cathode substrate 65 is flared along its top edge forming a an extended portion 64 extending from the top of the wound spiral as shown in FIG. 2A and 5. The flared cathode substrate portion 64 can be welded to the exposed side of metal tab 25 before the casing peripheral edge 22 is crimped around the end cap 18 to close the cell's open end 30. Alternatively, the end cap 18 can be welded along its peripheral edge to the inside surface of the casing peripheral edge 22. In such case the terminal 17 is desirably an integral part of end cap 18. Alternatively, terminal 17 can be formed as the top of an end cap assembly of the type described in U.S. Pat. No. 5,879,832 which assembly can be inserted into an opening in the surface of end cap 18 and then welded thereto.

A metal tab 44 (anode tab), preferably of nickel can be pressed into a portion of the lithium metal anode 40. Anode tab 44 can be pressed into the lithium metal at any point within the spiral, for example, it can be pressed into the lithium metal at the outermost layer of the spiral as shown in FIG. 2B. Anode tab 44 can be embossed on one side forming a plurality of raised portions on the side of the tab to be pressed into the lithium. The opposite side of tab 44 can be welded to the inside surface of the casing either to the inside surface of the casing side wall 24 as illustrated in FIG. 2B. It is even more desirable to weld the anode tab 44 to the inside surface of close end 35 of casing 20. It is preferable to weld anode tab 44 to the inside surface of the casing closed end 35, since this is readily accomplished by inserting an electrical spot welding probe (an elongated resistance welding electrode) into the cell core 98. If an insulator disk 74 is used at the bottom of casing 20 then such insulator can be provided with a central aperture 75 (FIG. 2B). The anode tab 44 can be located so that it lies under aperture 75. Thus, as the spot welding probe (not shown) is inserted into core 98 its tip passes through aperture 75 and contacts the portion of anode tab 44 underlying the aperture. The spot welding probe can then be activated in order to securely weld tab 74 to the inside surface of the casing closed end 35 of the casing. Alternatively, anode tab 44 can be spot welded to the inside surface of the casing side wall 24. In practice it has been determined to be more convenient to weld anode tab 44 to the inside of the casing closed end 35 as above described since core 98 provides a convenient entry for an electrical welding probe. However, one difficulty encountered with inserting the welding probe into the cell core passage 98 is that there is normally a piece 50*b* of separator 50 located within the center of core 98 and vertically aligned within core 98 as shown in FIG. 2B. This is because the electrode spiral 70 is typically formed by employing a wrapping mandrel (as above describe) which conveniently grips onto an exposed starter edge 50*b* of separator 50 in order to wind electrode composite 13. When the electrode spiral 70 is formed and the mandrel is removed from the spiral the starter edge 50*b* is left behind and appears within the center axis of core 98. This can interfere with the insertion of the spot welding probe into core 98. Thus the starter edge 50*b* of the separator can be an obstacle towards obtaining the desired welding of anode tab 44 to the inside surface of the casing closed end 35.

The electrode spiral 70 can be formed so that the cathode bottom edge 60a extends beyond the anode bottom edge 40a. Such configuration assures that essentially all of the anode active material is depleted during cell discharge. In order to accomplish this the cathode active material is in excess. This is conveniently accomplished by forming the cathode sheet 60 so that the cathode edge 60a extends below anode edge 40a. In the embodiment of the spirally wound electrode assembly 70 shown in FIG. 2B the bottom edge 50a of each revolution of separator sheet 50 extends beyond the bottom edge 60a of cathode sheet 60. This provides a measure of electrical insulation between the bottom edge 60a of the cathode sheet (positive) and the casing 20 (negative). Also, in the embodiment shown in FIG. 2B it has been determined desirable to include a separate electrically insulating disk 74 against the inside surface of the casing closed end 35 to provide additional protection against the possibility that any portion of the cathode sheet 60 could contact the casing 20. In particular insulating disk 74 protects against the possibility of such contact within the casing inside corner 23 at closed end 35.

The extension of bottom edge 50a of the separator sheet beyond the bottom edge 60a of the cathode sheet and inclusion of insulator disk 74 therefore protect against possible electrical shorting of the cell in the region of the casing closed end 35. However, such design has the disadvantage in that it creates void space, that is, uses up space which could otherwise be used to increase the total amount of anode and cathode active material in the cell.

In accordance with the present invention a way has been found to increase the cell capacity of spirally wound primary lithium cells without changing the basic cell chemistry and electrode thickness. Specifically, it has been determined that an improved structural design for the separator bottom edge 50a provides the required electrical insulation and also results in an increase in cell capacity. The electrode composite 13 can be made as above described and then spirally wound to form spiral electrode assembly 70 in the manner above described. However, before the spiral electrode assembly 70 is inserted into the casing 20, a heated platen can be applied to the exposed bottom edge 50a of separator 50 in order to heat form or mold (thermoform) the edge 50a into a flat continuous membrane 55 which covers and lies flush against the cathode sheet bottom edge 60a.

Figure 6:
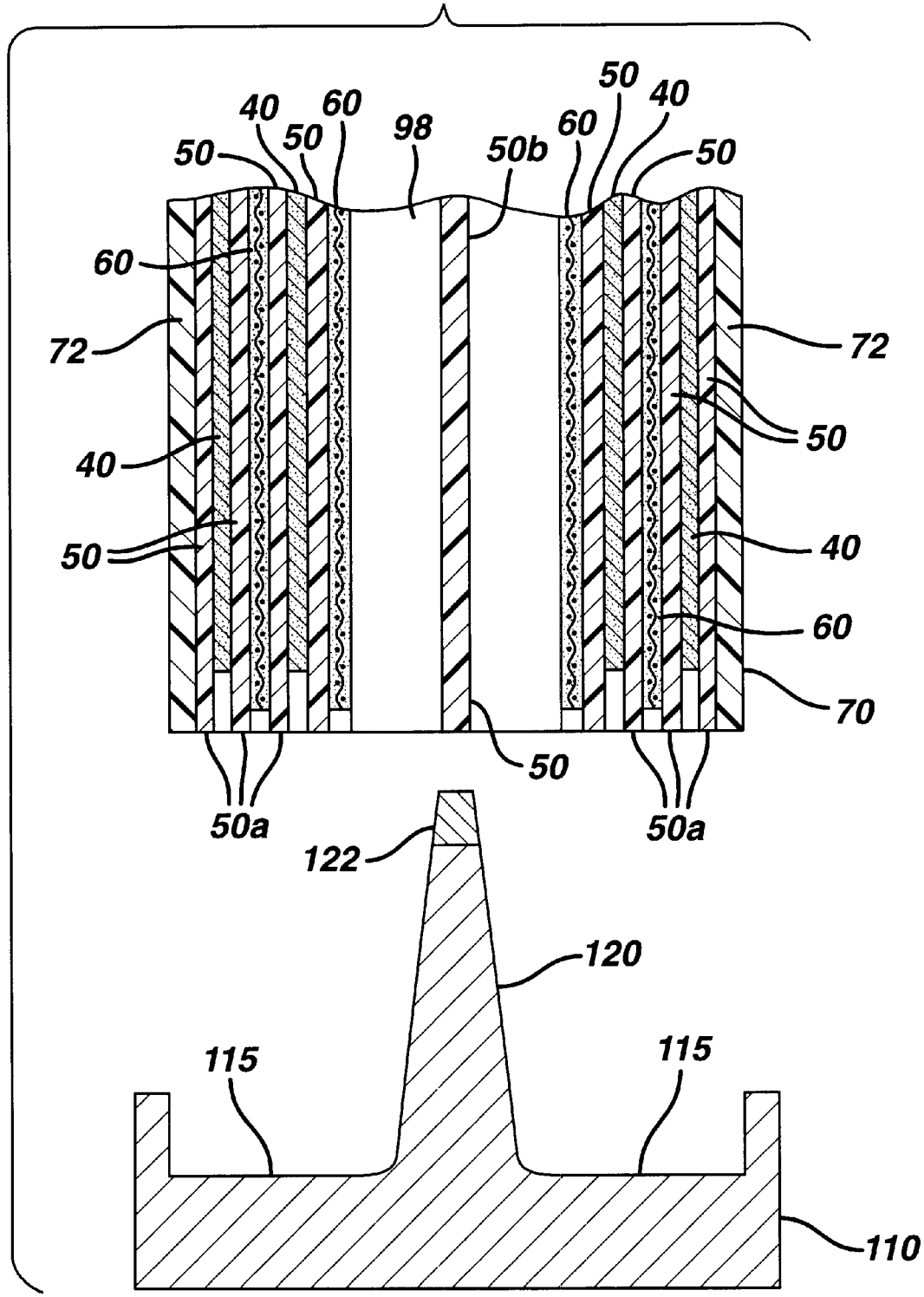
FIG. 6 is a schematic view showing a heated platen used to reshape (thermoform) the bottom edge of the separator sheet within the spirally wound electrode assembly.

In such heat forming the bottom edge 50a of each revolution of separator 50 is reshaped so that it forms a continuous membrane 55 which forms about a 90 degree angle with the separator body 50c as shown in FIG. 2C. That is, the heat forming reshapes the bottom edges 50a of the separator sheets 50 into a continuous flat membrane 55 which covers cathode bottom edge 60a and is aligned parallel to the casing closed end 35 as shown best in FIG. 2C. The membrane 55 could be formed with one or more opening therein if desired, but a continuous membrane without openings is preferred. The heat forming (thermoforming) can be accomplished by applying a heat source, preferably a heated platen or die 110 (FIG. 6) to the bottom edges 50a of each revolution of the separator 50 after the spiral electrode assembly 70 has been formed. Platen 110 may of metal, for example, steel or other heat conductive material that can be heated to the desired temperature level. Platen 110 has a cavity preferably in the form of an annular region 115 desirably circumventing an elongated member (center pin) 120. The elongated member 120 extends vertically upwards from the body of platen 110 (FIG. 6) and desirably terminates in a tapered or pointed end 122. Other forms of heat treatment could also be used in place of the heated platen. For example, bottom edge 50a of the separator can be heat formed using hot air or infrared light.

In accomplishing the heat forming process of the invention an electrode spiral 70 is first formed having the configuration as shown in FIG. 2B. However, instead of inserting the electrode spiral 70 directly into casing 20, the separator bottom edge 50a (extending below the cathode bottom edge 60a) are heat treated by pressing the annular region 115 of the heated platen 110 against the bottom of the spiral electrode assembly 70. The platen is preheated to a temperature sufficient to cause separator bottom edge 50a to soften or become sufficiently molten so that it becomes reshaped into a continuous flat sheet 55. The heat forming process of the invention can be applied to any conventional separator which has thermoplastic properties so that it can be reshaped upon heating. A preferred separator material is a sheet of microporous polypropylene. Separator 50 is desirably formed of a sheet of microporous polypropylene membrane of basis weight between about 13.5 to 16.5 g/m$^2$ and about 0.025 mm thick. If the separator 50 is of microporous polypropylene then platen 110 can be heated to a temperature which is above the softening point of the propylene, desirably a temperature between about 130 and 160 ° C. The annular region 115 of heated platen 110 is applied in pressure contact with the separator bottom edge 50a. The heated platen 110 is applied for a long enough period, for example, from about 1 to 4 seconds, to cause the separator bottom edge 50a to soften or melt sufficiently that it can be reshaped. The reshaped edges 50a form a continuous flat membrane which are still attached to and are integral with the separator body 50c. When the platen 110 is removed, the reshaped edge 50a quickly cools and solidifies into a continuous membrane 55 completely covering the bottom edge 60a of cathode sheet 60 as best illustrated in FIG. 2C.

After the bottom edge 50a of the separator has been reshaped into a continuous membrane 55, the electrode assembly 70 can be inserted into casing 20 so that continuous membrane 55 lies against casing closed end 35 (FIG. C). An insulator disk 74 can optionally be inserted into casing 20 first so that it lies against the inside surface of the closed end 35. The electrode assembly 70 can then be inserted into casing 20 so that the reshaped separator bottom edge 50a, namely membrane 55, lies flush against the top surface of insulator disk 74. Although insulator disk 74 can be used to provide an added measure of electrical insulation at the closed end of casing 20, it has been determined that when the bottom edge 50a of the separator is reshaped by heat forming as above described, insulator disk 74 can be eliminated. Thus, in the preferred embodiment (FIG. 2C) after the bottom edge 50a of separator 50 is reshaped as above described, the spiral electrode assembly 70 is inserted into casing 20 so that the reshaped separator edge 50a (now membrane 55) comes to rest flush against the inside surface of closed end 35 of the casing as shown in FIG. 2C. In such preferred embodiment membrane 55 covers and lies flush against the cathode bottom edge 60a of spiral electrode assembly 70. Separator membrane 55 provides a continuous sheet of electrical insulation between cathode 60 and casing 20 in the region of the closed end 35 of the casing.

Also, as above described, it has been determined advantageous to design heated platen 110 so that it has an elongated member 120 extending vertically from the body of the platen. In such embodiment as the heated platen 110 is applied to the separator bottom edge 50a, the elongated member 120 becomes inserted into the core 98 of the spiral electrode assembly 70. The width of elongated member 120 is about the same as the diameter of core 98 so that as the elongated member 120 is inserted into core 98, it pushes against the body of separator piece 50b which lies loosely within core 98. (Separator piece 50b is used as grab edge during the winding process and therefore appears within core 98.) The heated elongated member 120 softens separator piece 50b and pushes the piece against the surface of the first layer of the wind defining the wall of core 98, thereby causing separator piece 50b to become thermoformed (adhered) to said first layer as shown best in FIG. 2C. This results in removal of separator piece 50b from the center of core 98 thereby making it easier for a spot welding probe to be inserted into core 98 in order to weld anode tab 44 to the closed end 35 of the cell casing 20 (FIG. 2C).

In sum the reshaping the separator bottom edge 50a by heat forming it into a flat membrane by the thermoforming method of the invention eliminates void space between the cathode 60 and the closed end 35 of casing 20. The reshaped separator bottom edge 50a, namely, continuous separator membrane 55 covers and lies flush against the bottom edge 60a of the wound cathode sheet (FIG. 2C) The separator membrane 55 seals off each revolution of the cathode bottom edge 60a to provide the required electrical insulation between the cathode sheet 60 and the closed end 35 of the casing. This also eliminates the need to employ a separate insulator disk 74 at the closed end 35 of the casing. Reshaping the separator bottom edge 50a and elimination of insulator disk 74 thus reduces the amount of void space within the cell. The saved space can be utilized by increasing the amount of anode and cathode active material, for example, by employing wider electrode sheets. This in turn increases cell capacity for any given cell size.

After the spiral electrode assembly 70 is inserted into casing 20 and anode tab 44 is welded to closed end 35, a plastic insulating disk 80 can be inserted into the open end 30 of casing 20. The peripheral edge 85 of insulating disk 80 fits snugly into the open end 30 and presses against the inside surface of the peripheral edge 22 of casing 20. The positive end cap 18 (cover) is then inserted into the open end 30 so that edge 85 of the insulating disk 80 electrically insulates end cap 18 from casing 20. Alternatively, an end cap assembly 15 can be formed of end cap 18 and insulating disk 80, and the end cap assembly 15 can be inserted as a separate unit into the casing open end 30. End cap 18 desirably has a vent 19 which can contain a rupturable membrane designed to rupture and allow gas to escape if the gas pressure within the cell exceeds a predetermined level. The end cap 18 has metal tab 25 (cathode tab) welded to a portion of its under surface (FIG. 2A). The tab penetrates through an opening in insulating disk 80 so that it can be welded to the extended portion 64 of the cathode substrate 65 as above described. After metal tab 25 is welded to the extended portion 64 of cathode substrate 65, the peripheral edge 22 of the casing can then be crimped around the peripheral edge 85 of the insulating disk 80 to permanently close open end 30 and to hold end cap 18 firmly sealed within the cell as shown in FIG. 1.

Although the present invention is described with respect to a primary lithium cell, the invention can also be applied to other cells having spirally wound electrodes. Such cells, for example, include secondary (rechargeable cells) such as lithium ion and nickel metal hydride rechargeable cells. Although the present invention was described with respect to one or more specific embodiments, it should be appreciated that variations are possible within the concept of the invention. Accordingly, the scope of the invention is not intended to be limited by the specific embodiments, but rather is better reflected the claims and equivalents thereof.

What is claimed is:

1. A method of forming a wound electrode assembly for a primary lithium cell comprising the steps of:

(a) placing an electrolyte permeable separator sheet between an anode sheet comprising lithium and a cathode sheet comprising a manganese dioxide;

(b) winding said sheets into a spiral roll;

(c) applying a heat source to an exposed edge of each revolution of the separator sheet causing said edge to become molten and transform into a continuous separator membrane covering an edge of each revolution of said cathode and anode sheets, wherein the heat source (step c) is a heated platen applied to an exposed edge of said separator sheet causing said edge to mold into a continuous separator membrane covering each revolution of an edge of said cathode and anode sheets.

2. A method of forming a wound electrode assembly for a primary lithium cell comprising the steps of:

(a) placing an electrolyte permeable separator sheet between an anode sheet comprising lithium and a cathode sheet comprising a manganese dioxide;

(b) winding said sheets into a spiral roll;

(c) applying a heat source to an exposed edge of each revolution of the separator sheet causing said edge to become molten and transform into a continuous separator membrane covering an edge of each revolution of said cathode and anode sheets, wherein the heat source (step c) is a heated platen applied to an exposed edge of said separator sheet causing said edge to mold into a continuous separator membrane covering each revolution of an edge of said cathode and anode sheets;

(d) inserting said electrode assembly into a cell casing so that said continuous separator membrane abuts a surface of said casing and provides electrical insulation between said casing and said cathode and anode sheets.

3. A method of forming a wound electrode assembly for a primary lithium cell comprising the steps of:

(a) placing an electrolyte permeable separator sheet between an anode sheet comprising lithium and a cathode sheet comprising a manganese dioxide;

(b) winding said sheets into a spiral roll;

(c) applying a heat source to an exposed edge of each revolution of the separator sheet causing said edge to become molten and transform into a continuous separator membrane covering an edge of each revolution of said cathode and anode sheets, wherein the heat source (step c) is a heated platen applied to an exposed edge of said separator sheet causing said edge to mold into a continuous separator membrane covering each revolution of an edge of said cathode and anode sheets;

(d) inserting said electrode assembly into a cell casing so that said continuous separator membrane abuts a surface of said casing and provides electrical insulation between said casing and said cathode and anode sheets; wherein said spiral roll (step b) has a core region around its central longitudinal axis and a mobile portion of said separator sheet is located within said core region, the method further comprising inserting a portion of said heated platen into said core contemporaneously with applying said platen to the exposed edge of said separator sheet in step (c) thereby causing said portion of said separator sheet within said core to become molded to the wall of said core.

4. A method of forming a wound electrode assembly for a primary lithium cell comprising the steps of:

(a) placing an electrolyte permeable separator sheet between an anode sheet comprising lithium and a cathode sheet comprising a manganese dioxide;

(b) winding said sheets into a spiral roll;

(c) applying a heat source to an exposed edge of each revolution of the separator sheet causing said edge to become molten and transform into a continuous separator membrane covering an edge of each revolution of said cathode and anode sheets, wherein the heat source (step c) is a heated platen applied to an exposed edge of said separator sheet causing said edge to mold into a continuous separator membrane covering each revolution of an edge of said cathode and anode sheets;

(d) inserting said electrode assembly into a cell casing so that said continuous separator membrane abuts a surface of said casing and provides electrical insulation between said casing and said cathode and anode sheets; wherein said spiral roll (step b) has a core region around its central longitudinal axis and a mobile portion of said separator sheet is located within said core region, the method further comprising inserting a portion of said heated platen into said core contemporaneously with applying said platen to the exposed edge of said separator sheet in step (c) thereby causing said portion of said separator sheet within said core to become molded to the wall of said core;

(e) inserting a spot welding probe into the core of said spiral roll to weld a portion of the anode sheet to the casing.

* * * * *